United States Patent
Kajita et al.

(10) Patent No.: US 10,147,952 B2
(45) Date of Patent: Dec. 4, 2018

(54) ELECTRODE BINDER COMPOSITION AND ELECTRODE

(71) Applicant: NEC Corporation, Tokyo (JP)

(72) Inventors: Tetsuya Kajita, Tokyo (JP); Shin Serizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 14/895,586

(22) PCT Filed: Jun. 3, 2014

(86) PCT No.: PCT/JP2014/064776
§ 371 (c)(1),
(2) Date: Dec. 3, 2015

(87) PCT Pub. No.: WO2014/196543
PCT Pub. Date: Dec. 11, 2014

(65) Prior Publication Data
US 2016/0133935 A1    May 12, 2016

(30) Foreign Application Priority Data
Jun. 4, 2013   (JP) .................................. 2013-118357

(51) Int. Cl.
*H01M 4/62* (2006.01)
*H01M 10/052* (2010.01)
(Continued)

(52) U.S. Cl.
CPC ............. *H01M 4/622* (2013.01); *B29B 7/002* (2013.01); *C08G 73/10* (2013.01); *C08L 77/06* (2013.01);
(Continued)

(58) Field of Classification Search
CPC ...... H01M 4/622; H01M 4/623; H01M 4/364; H01M 4/38; H01M 4/0404; H01M 4/405;
(Continued)

(56) References Cited

U.S. PATENT DOCUMENTS

| 2008/0124631 | A1 | 5/2008 | Fukui et al. | |
| 2008/0131783 | A1* | 6/2008 | Choi | H01M 4/134 429/232 |
| 2013/0171520 | A1 | 7/2013 | Nakayama et al. | |
| 2013/0244086 | A1 | 9/2013 | Iriyama et al. | |
| 2014/0038046 | A1* | 2/2014 | Lee | H01M 4/622 429/217 |
| 2015/0017534 | A1* | 1/2015 | Miyuki | H01M 4/622 429/217 |

FOREIGN PATENT DOCUMENTS

| JP | H06-163031 A | 6/1994 |
| JP | 2008-135384 A | 6/2008 |

(Continued)

OTHER PUBLICATIONS

International Search Report dated Aug. 26, 2014 in corresponding PCT International application.

(Continued)

*Primary Examiner* — Eugenia Wang
(74) *Attorney, Agent, or Firm* — Finnegan, Henderson, Farabow, Garrett & Dunner, LLP

(57) ABSTRACT

The present invention relates to an electrode binder composition including a high-molecular-weight poly(amic acid) having a weight-average molecular weight of 5,000 or more and 100,000 or less and a low-molecular-weight poly(amic acid) having a weight-average molecular weight of 100 or more and 2,000 or less, and the present invention can provide an electrode binder composition that leads to a (Continued)

secondary battery having a high capacity superior in the initial charge/discharge efficiency and the cycle characteristics.

15 Claims, 1 Drawing Sheet

(51) Int. Cl.

| | | |
|---|---|---|
| *H01M 4/38* | (2006.01) | |
| *H01M 4/04* | (2006.01) | |
| *H01M 4/40* | (2006.01) | |
| *H01M 10/0525* | (2010.01) | |
| *H01M 4/583* | (2010.01) | |
| *H01M 4/60* | (2006.01) | |
| *H01M 4/133* | (2010.01) | |
| *H01M 4/1395* | (2010.01) | |
| *H01M 4/587* | (2010.01) | |
| *H01M 4/134* | (2010.01) | |
| *H01M 4/1393* | (2010.01) | |
| *C08L 77/06* | (2006.01) | |
| *B29B 7/00* | (2006.01) | |
| *C08G 73/10* | (2006.01) | |
| *H01M 4/36* | (2006.01) | |

(52) U.S. Cl.
CPC ....... *H01M 4/0404* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/38* (2013.01); *H01M 4/405* (2013.01); *H01M 4/583* (2013.01); *H01M 4/587* (2013.01); *H01M 4/60* (2013.01); *H01M 10/052* (2013.01); *H01M 10/0525* (2013.01); *H01M 2220/30* (2013.01)

(58) Field of Classification Search
CPC ...... H01M 4/0471; H01M 4/583; H01M 4/60; H01M 4/133; H01M 4/1395; H01M 4/587; H01M 4/134; H01M 4/1393; H01M 2220/30; H01M 10/052; H01M 10/0525; C08L 77/06; B29B 7/002; C08G 73/10

See application file for complete search history.

(56) References Cited

FOREIGN PATENT DOCUMENTS

| | | |
|---|---|---|
| JP | 2008-144159 A | 6/2008 |
| JP | 2011-144217 | 7/2011 |
| JP | 2012-207196 | 10/2012 |
| JP | 2012-209219 | 10/2012 |
| JP | 2012-233177 | 11/2012 |
| JP | 5099394 | 12/2012 |
| JP | 2013-4371 | 1/2013 |
| JP | 2014-32908 | 2/2014 |
| WO | WO 2012/029624 A1 | 3/2012 |
| WO | WO 2014/057749 A1 | 4/2014 |
| WO | WO 2017/138604 A1 | 8/2017 |

OTHER PUBLICATIONS

Y. Maekawa et al., "Solution properties of polyamic acids and their amine salts", Reactive and Functional Polymers, vol. 30, No. 1, pp. 71-73, Jun. 1996.

BPDA, Wikipedia, XP055327658, Retrieved from the Internet: URL:https://en.wikipedia.org/w/index.php?title=BPDA&oldid=519946049 [retrieved on Dec. 9, 2016], Oct. 2012.

p-Phenylenediamine, Wikipedia, XP055327656, Retrieved from the Internet: URL:https://en.wikipedia.org/w/index.php?title=P-Pheylenediamine&oldid=490319736 [retrieved on Dec. 9, 2016], May 2012.

Extended European Search Report dated Dec. 20, 2016, by the European Patent Office in counterpart European Patent Application No. 14806911.5.

Notice of Reasons for Rejection, dated Apr. 19, 2018, issued by the Japanese Patent Office (JPO) in counterpart Japanese Application No. 2015-521459.

\* cited by examiner

ELECTRODE BINDER COMPOSITION AND ELECTRODE

CROSS-REFERENCE TO RELATED PATENT APPLICATIONS

This application is a National Stage Entry of International Application No. PCT/JP2014/064776, filed Jun. 3, 2014, which claims priority from Japanese Patent Application No. 2013-118357, filed Jun. 4, 2013. The entire contents of the above-referenced applications are expressly incorporated herein by reference.

TECHNICAL FIELD

The present invention relates to electrode binder compositions, and more specifically, relates to an electrode binder composition that leads to a secondary battery superior in the initial charge/discharge efficiency and the cycle characteristics. In addition, the present invention relates to an electrode using the binder composition and a secondary battery using the electrode, and a method for manufacturing the electrode and the secondary battery.

BACKGROUND ART

Since mobile devices such as mobile phones and notebook computers have become widespread, the role of secondary batteries is currently focused as power sources for the devices. These secondary batteries are required to be small and light and to have high capacities, performances that are less prone to deterioration even after repeating charge and discharge, and a high level of safety, and lithium-ion secondary batteries are most often used currently.

Negative electrodes of the lithium-ion secondary batteries are mainly made of carbon (C) such as graphite and hard carbon. Carbon can successfully repeat charge/discharge cycles, but large increase in capacities in future is not expectable because the capacities are already used until near the theoretical capacity. On the other hand, there are strong demands for increase in capacities of the lithium-ion secondary batteries, and materials for negative electrodes having higher capacities than that of carbon have been studied.

Examples of the materials for negative electrodes that can enable higher capacities include silicon (Si). Negative electrodes with Si have higher capacities because the absorption/desorption amount of lithium ions per unit volume is large. However, they have a disadvantage that large expansion and contraction of the electrode active materials themselves in absorbing and desorbing lithium ions promotes pulverization, which results in short charge/discharge cycle life.

Patent Literature 1 suggests the use of a high-strength binder for improving the charge/discharge cycle life. In Patent Literature 1, it is confirmed that the use of a polyimide as a binder can suppress expansion and contraction of the volume of Si particles during charging and discharging and can improve cycle characteristics. Patent Literature 2 discloses that cycle characteristics of a secondary battery are improved by incorporating a polyimide and a polyvinylidene fluoride in a binding agent of a negative electrode that contains silicon particles and/or silicon alloy particles as active material(s).

CITATION LIST

Patent Literature

Patent Literature 1: Japanese Patent No. 5099394
Patent Literature 2: Japanese Patent Laid-Open No. 2012-209219

SUMMARY OF INVENTION

Technical Problem

However, more improvements have been desired in a practical view. Considering the problems described above, it is an object of the present invention to provide an electrode binder composition that leads to a non-aqueous electrolyte secondary battery having a high capacity superior in the initial charge/discharge efficiency and the cycle characteristics.

Solution to Problem

An aspect of the present invention relates to an electrode binder composition including a high-molecular-weight poly(amic acid) having a weight-average molecular weight of 5,000 or more and 100,000 or less and a low-molecular-weight poly(amic acid) having a weight-average molecular weight of 100 or more and 2,000 or less.

Advantageous Effect of Invention

The present invention can provide a binder composition that leads to a non-aqueous electrolyte secondary battery having a high capacity superior in the initial charge/discharge efficiency and the cycle characteristics.

DESCRIPTION OF EMBODIMENTS

Figure 1:
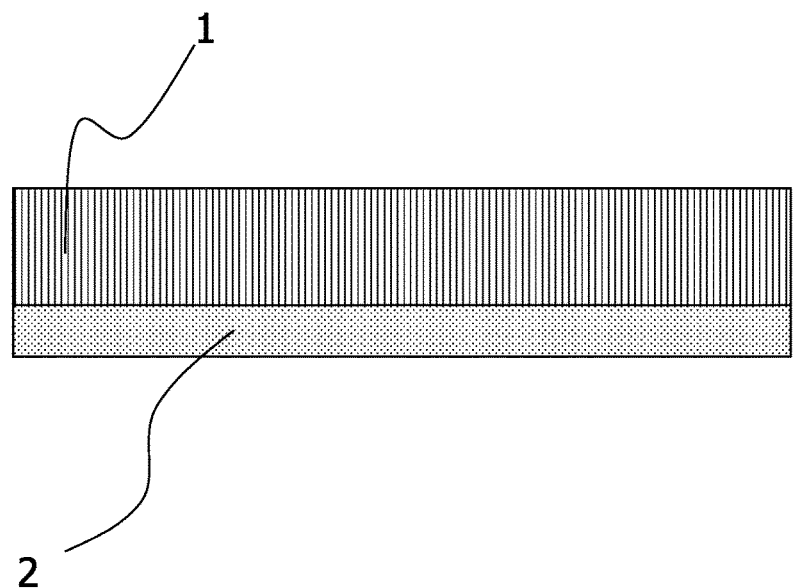
FIG. 1 is a cross-sectional view of a negative electrode produced with the binder composition according to the present invention.

The inventors of the present invention have found as a result of hard studies that the initial charge/discharge efficiency and the cycle characteristics of a non-aqueous electrolyte secondary battery are improved by producing the electrode from an electrode mixture slurry containing the binder composition and an active material, using a binder composition containing a high-molecular-weight poly(amic acid) solution and a low-molecular-weight poly(amic acid) solution. The effect of improving the cycle characteristics is particularly large in a secondary battery in which a silicon material such as Si and Si alloys, the volume of which changes largely during charging and discharging, is used as a negative electrode active material.

The following describes a preferable embodiment of the binder composition of the present invention, an electrode produced with the binder composition, and a non-aqueous electrolyte secondary battery including the electrode.

Binder Composition

In the present embodiment, an electrode binder composition contains a high-molecular-weight poly(amic acid) and a low-molecular-weight poly(amic acid).

The molecular weight of the high-molecular-weight poly(amic acid) is preferably 5,000 or more and 100,000 or less, more preferably 10,000 or more and 50,000 or less. The molecular weight of the low-molecular-weight poly(amic acid) is preferably 100 or more and 2,000 or less, more preferably 200 or more and 1,000 or less. The existence of the high-molecular-weight and low-molecular-weight poly(amic acid)s in the binder composition can be confirmed by the existence of the peaks of the above high molecular weight and the above low molecular weight when measured by gel permeation chromatography. In the present specification, the molecular weight of a poly(amic acid) is represented in terms of the weight-average molecular weight.

The combined use of the above high-molecular-weight poly(amic acid) and the low-molecular-weight poly(amic acid) is considered to enable sufficient strength (such as the strength of an active material layer and sufficient binding properties between the active material and a current collector) to be retained in the electrode produced with the binder composition without large decreases in the electron conductivity of the active material layer. Consequently, the electrode with the binder composition is considered to be able to achieve a secondary battery having higher initial charge/discharge efficiency and a higher capacity and to achieve superior cycle characteristics.

The weight ratio of the high-molecular-weight poly(amic acid) to the low-molecular-weight poly(amic acid) in the binder composition is commonly in the range of 2:10 to 10:2, preferably in the range of 4:10 to 10:4, and more preferably in the range of 5:10 to 10:5.

The poly(amic acid) is not particularly limited, provided that the poly(amic acid) has the above molecular weight. The poly(amic acid) can be synthesized by a known method using a tetracarboxylic acid dianhydride and a diamine, for example. The manufacturing method is not particularly limited, and examples thereof include the method disclosed in Japanese Patent No. 5099394. Commercially available poly(amic acid) solutions may also be used. In the present specification, the word poly(amic acid) means a compound having at least one amic acid structure.

Examples of the tetracarboxylic acid dianhydride used for the synthesis of the poly(amic acid) include aliphatic tetracarboxylic acid anhydrides, alicyclic tetracarboxylic acid anhydrides, and aromatic tetracarboxylic acid anhydrides. Among these, compounds including aromatic tetracarboxylic acid anhydrides are preferable.

Examples of the diamine used for the synthesis of the poly(amic acid) include aliphatic diamines, alicyclic diamines, and aromatic diamines. Among these, compounds including aromatic diamines are preferable.

The synthesis reaction of the poly(amic acid) is preferably performed in an organic solvent, and solvents that can be commonly used for a synthesis reaction of a poly(amic acid) can be used as the organic solvent, examples of which including polar aprotic solvents, phenols, alcohols, ketones, ethers, esters, and hydrocarbons.

The synthesis method of the low-molecular-weight poly(amic acid) is not particularly limited, and examples thereof include the method disclosed in Japanese Patent Laid-Open No. 2008-144159.

In the present embodiment, the binder composition may be in any form, provided that the binder composition contains the poly(amic acid) having the above molecular weight. The binder composition may be dispersed or dissolved in a non-aqueous solvent such as N-methylpyrrolidone and N,N-dimethylacetamide, for example.

Electrode

The electrode according to the present invention is produced by forming an active material layer on a current collector using electrode mixture slurry containing an electrode active material and the above binder composition according to the present invention. Thus, the electrode according to the present embodiment contains the electrode active material and a polyimide generated through imidization of the above high-molecular-weight and above low-molecular-weight poly(amic acid)s.

The electrode according to the present invention may be used as a positive electrode, a negative electrode, or both positive and negative electrodes. In particular, use in a negative electrode containing an active material such as a silicon material, the volume of which changes largely during charging and discharging, is more preferable because the electrode according to the present invention is superior in binding properties.

The following describes an example of the method for manufacturing the electrode according to the present invention by taking the configuration of a negative electrode as an example.

Negative Electrode
(Negative Electrode Active Material)

A negative electrode active material is not particularly limited, provided that the negative electrode active material contains a material that can absorb and desorb lithium, and examples thereof include metals that can form alloys with lithium, and carbon materials and metal oxides that can absorb and desorb lithium ions. Among these, containing at least one selected from the group consisting of the metals that can alloy with lithium and the carbon materials is particularly preferable.

Examples of the metals that can form alloys include metals mainly including Si, Sn, In, Al, Pb, Zn, Cd, Sb, Bi, Ag, Ba, Ca, Hg, Pd, Pt, Te, and La, alloys of two or more of these metals, and alloys of these metals or alloys with lithium. Among these, containing Si, Sn, In, or Al is preferable, and containing Si is particularly preferable. Only one of them may be used, and two or more may be used in combination. These metals are preferably in the range of 1% by mass or more and 99% by mass or less in the negative electrode active material. In one embodiment, the preferable range is 1% by mass or more and 80% by mass or less, and the more preferable range may be 3% by mass or more and 30% by mass or less in some cases.

Examples of the carbon materials include carbon materials such as graphite and hard carbon, which perform charging and discharging. Only one of them may be used, and two or more may be used in combination. The carbon materials are preferably in the range of 1% by mass or more and 80% by mass or less, and more preferably in the range of 2% by mass or more and 30% by mass or less in the negative electrode active material.

(Method for Manufacturing Negative Electrode)

As a method for producing a negative electrode, specifically, production can be performed by dispersing a binder composition containing the above negative electrode active material and the poly(amic acid) according to the present invention in a solvent such as N-methyl-2-pyrrolidone (NMP), kneading the dispersion to produce a kneaded product (electrode mixture slurry), applying the electrode mixture slurry to a negative-electrode current collector such as metal foil, and drying it in a high-temperature atmosphere.

In the above electrode mixture slurry, the total solute weight of the high-molecular-weight poly(amic acid) and the low-molecular-weight poly(amic acid) is commonly 1% by mass to 30% by mass, preferably 3% by mass to 25% by mass, more preferably 4% by mass to 20% by mass, and in one embodiment, even more preferably 4% by mass to 15% by mass of the negative electrode active material.

The above electrode mixture slurry can contain a solvent and can be processed into well-known forms by applying the slurry kneaded with a solvent to a negative-electrode current collector such as copper foil and performing rolling processing to form a coated plate, or performing direct pressing to form a pressed plate.

The solvent may be the same as or different from the solvent contained in the binder composition, and examples of the solvent include organic solvents such as N-methyl-2-pyrrolidone (NMP) and toluene and aqueous solvents, and among them, N-methyl-2-pyrrolidone is preferable.

The temperature while the drying in the high-temperature atmosphere is preferably in a temperature range that appropriately causes imidization reactions and preferably at the glass transition temperature of the polyimide or higher. The drying is performed preferably at such a temperature as not to cause thermal decomposition of the polyimide. The temperature while the drying in the high-temperature atmosphere is commonly 250° C. to 450° C., preferably 300° C. to 400° C., and more preferably 330° C. to 360° C.

The time of the drying in the above high-temperature atmosphere is commonly 30 minutes or more and 4 hours or less, preferably 30 minutes or more and 2 hours or less, and more preferably 30 minutes or more and 1 hour or less.

The above drying is performed preferably under a non-oxidative atmosphere. Known inert gas atmospheres can be used as the non-oxidative atmosphere, and examples thereof include nitrogen, argon, helium, krypton, xenon, and mixtures thereof.

The negative-electrode active material layer may contain other components as necessary. For example, carbon materials such as carbon black and acetylene black, which do not perform charging and discharging, and which are different from the carbon materials used as the above-described active material may be mixed as conductivity-imparting agents. When other components are contained, the components are preferably dispersed in the above electrode mixture slurry and used.

The electrode density of the negative-electrode active material layer is preferably 0.5 g/cm$^3$ or more and 2.0 g/cm$^3$ or less. When the electrode density is less than 0.5 g/cm$^3$, the absolute value of the discharge capacity is small, and the advantages over conventional carbon materials cannot be obtained in some cases. On the other hand, when the electrode density exceeds 2.0 g/cm$^3$, impregnating the electrode with an electrolytic solution is difficult, and the discharge capacity decreases in some cases.

The negative-electrode current collector preferably has a thickness sufficient to maintain the strength, and thus the thickness is preferably 4 to 100 µm and more preferably 5 to 30 µm to increase the energy density. The negative-electrode current collector is not particularly limited but preferably aluminum, nickel, copper, silver, or an alloy containing two or more of these metals in view of electrochemical stability. Examples of its shape include foil, plate, and mesh.

Positive Electrode

The positive electrode according to the present embodiment includes a positive-electrode current collector and a positive-electrode active material layer that is supported on one side or both sides of the positive-electrode current collector and contains a positive electrode active material, a conductive agent, and a binding agent.

The positive electrode may be produced by the above method for manufacturing an electrode according to the present invention as the method for manufacturing the negative electrode, or may be produced by a known method. Examples of the known method can include formation of the positive-electrode active material layer on the positive-electrode current collector by preparing a slurry containing a positive electrode active material, a positive electrode binder, and a solvent, and further containing a conductive auxiliary material as necessary, applying the slurry on the positive-electrode current collector, and drying it.

The positive electrode active material is preferably an oxide that can absorb and desorb lithium, and examples of the oxide include, but not particularly limited to, lithium manganates having a layered structure, lithium manganates having a spinel structure such as LiMnO$_2$, Li$_x$Mn$_2$O$_4$ (0<x<2), Li$_2$MnO$_3$, and Li$_x$Mn$_{1.5}$Ni$_{0.5}$O$_4$ (0<x<2); LiCoO$_2$, LiNiO$_2$, or these oxides in which part of the transition metals is replaced with other metals; lithium transition-metal oxides such as LiNi$_{1/3}$Co$_{1/3}$Mn$_{1/3}$O$_2$ in which particular transition metals do not exceed the half; and oxides including excessive Li compared to the stoichiometric compositions of these lithium transition-metal oxides. In view of increasing the energy density of the secondary battery, Li$_\alpha$Ni$_\beta$Co$_\gamma$Al$_\delta$O$_2$ (1≤α≤2, β+γ+δ=1, β≥0.7, and γ≤0.2) or Li$_\alpha$Ni$_\beta$Co$_\gamma$Mn$_\delta$O$_2$ (1≤α≤1.2, β+γ+δ=1, β≥0.6, and γ≤0.2) is particularly preferable.

Materials, the charge curves of which include the region of 4.5 V or more to lithium metal, can also be preferably used.

Spinel materials, olivine materials, layered materials, and the like, examples of which will be presented below, are preferably used as the materials, the charge curves of which include the region of 4.5 V or more to lithium metal.

Examples of the spinel materials include materials represented by Formula (1):

$$Li_a(M_xMn_{2-x-y}Y_y)(O_{4-w}Z_w) \tag{1}$$

wherein x satisfies 0≤x≤1.2, preferably 0.4<x<1.1, y satisfies 0≤y, preferably 0≤y<0.5, and x+y<2, 0≤a≤1.2, and 0≤w≤1; and M includes at least one selected from Co, Ni, Fe, Cr, and Cu, Y includes at least one selected from Li, B, Na, Al, Mg, Ti, Si, K, and Ca, and Z includes at least one of F and Cl, such as LiNi$_{0.5}$Mn$_{1.5}$O$_4$, LiCoMnO$_4$, LiCrMnO$_4$, LiFeMnO$_4$, and LiCu$_{0.5}$Mn$_{1.5}$O$_4$.

Examples of the olivine materials include materials represented by Formula (2):

$$LiMPO_4 \tag{2}$$

wherein M is transition metal(s) preferably including one or more selected from Fe, Mn, Co, and Ni, and is more preferably either Co or Ni.

Examples of the layered materials include materials represented by Formula (3):

$$Li(Li_xM_{1-x-z}Mn_z)O_2 \tag{3}$$

wherein 0≤x<0.3, 0.3≤z≤0.7, and M is at least one selected from Co, Ni, and Fe. Materials in which part of these metal oxides is substituted by Al, Fe, P, Ti, Si, Pb, Sn, In, Bi, Ag, Ba, Ca, Hg, Pd, Pt, Te, Zn, La, and the like can also be used.

One positive electrode active material can be used alone, or two or more can be used in combination.

Examples of the positive electrode binder include polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimides, and polyamide-imides. In particular, polyvinylidene fluoride is preferable in view of versatility and low costs. The amount of the positive electrode binder to be used is commonly 0.5 parts by mass to 30 parts by mass, preferably 1 part by mass to 20 parts by mass, and in one embodiment, more preferably 2 to 10 part by mass relative to 100 parts by mass of the positive electrode active material in view of binding force and the energy density that are in trade-off relation.

For example, aluminum, nickel, silver, stainless steel (SUS), valve metals, or alloys of these metals can be used as the positive-electrode current collector in view of electrochemical stability. Examples of the shape of the current collector include foil, plates, and mesh. In particular, aluminum foil can be preferably used. The metal foil of the positive-electrode current collector preferably has a thickness sufficient to maintain the strength, and the thickness is preferably 4 to 100 µm and more preferably 5 to 30 µm to increase the energy density.

A conductive auxiliary material may be added to the positive electrode for the purpose of decreasing impedance. Examples of the conductive auxiliary material include carbonaceous fine particles such as graphite, carbon black, and acetylene black.

The electrode density of the positive-electrode active material layer is preferably 2.0 g/cm$^3$ or more and 3.0 g/cm$^3$ or less. The absolute value of the discharge capacity will be small when the electrode density is too low. On the other hand, when the electrode density is too high, impregnating the electrode with an electrolytic solution is difficult, and the discharge capacity decreases.

Electrolytic Solution

Non-aqueous electrolytic solutions, in which a supporting salt is dissolved in a solvent, can be used as an electrolytic solution.

Examples of the solvents include cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, and ethyl propionate; γ-lactones such as γ-butyrolactone; chain ethers such as 1,2-diethoxyethane (DEE) and ethoxymethoxyethane (EME); cyclic ethers such as tetrahydrofuran and 2-methyltetrahydrofuran; aprotic organic solvents such as dimethyl sulfoxide, 1,3-dioxolane, formamide, acetamide, dimethylformamide, acetonitrile, propionitrile, nitromethane, ethylmonoglyme, phosphate triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, N-methylpyrrolidone, and fluorinated carboxylic acid esters; and derivatives thereof (including fluorides). These can be used singly, or in a mixture of two or more.

Among these, use of propylene carbonate, ethylene carbonate, γ-butyrolactone, dimethyl carbonate, diethyl carbonate, or ethyl methyl carbonate alone or as a mixture is preferable.

When the positive electrode active material works in a high electric potential of 4.5 V or higher, use of oxidation-resistant solvents in combination is preferable, and examples of the oxidation-resistant solvent include fluorinated ethers, sulfone compounds, and fluorinated phosphate esters. These solvents can be used singly, or in combinations of two or more.

A lithium salt can be used as the supporting salt, for example. Examples of the lithium salt include $LiPF_6$, lithium imide salts, $LiAsF_6$, $LiAlCl_4$, $LiClO_4$, $LiBF_4$, and $LiSbF_6$. Examples of the lithium imide salts include $LiN(C_kF_{2k+1}SO_2)(C_mF_{2m+1}SO_2)$ where k and m are each independently a natural number, preferably 1 or 2. Only one of them may be used, and two or more may be used in combination.

The concentration of the lithium salt in the non-aqueous electrolytic solution is preferably 0.7 mol/L or more and 2.0 mol/L or less. Setting the concentration of the lithium salt to be 0.7 mol/L or more can provide sufficient ionic conductivity. Setting the concentration of the lithium salt to be 2.0 mol/L or less can decrease the viscosity, and thus transfer of lithium ions is not hindered.

In the present embodiment, the electrolytic solution may contain additives other than the above compounds as necessary. Examples of other additives include overcharge preventing agents and surfactants.

Separator

Examples of a separator provided between the positive electrode and the negative electrode include porous polymer membranes made of polyolefins such as polyethylene and polypropylene, polyimides, fluororesins such as polyvinylidene fluoride, cellulose, and the like; woven fabric, nonwoven fabric, and ion-conducting polymer electrolyte membranes. These membranes or fabrics can be used alone or in combination. A ceramic material may adhere to or be fixed on the surface of the separator as necessary for improvement of safety or the like.

Outer Package

An outer package of the secondary battery can be selected as appropriate, provided that the material to be selected is stable toward the electrolytic solution and has sufficient moisture barrier properties. For example, laminate films made of aluminum, silica-coated polypropylene, polyethylene or the like can be used as the outer package of a laminated secondary battery. In particular, use of an aluminum laminate film is preferable in view of suppressing volume expansion.

Shape of Secondary Battery and Method for Manufacturing Thereof

Figure 2:
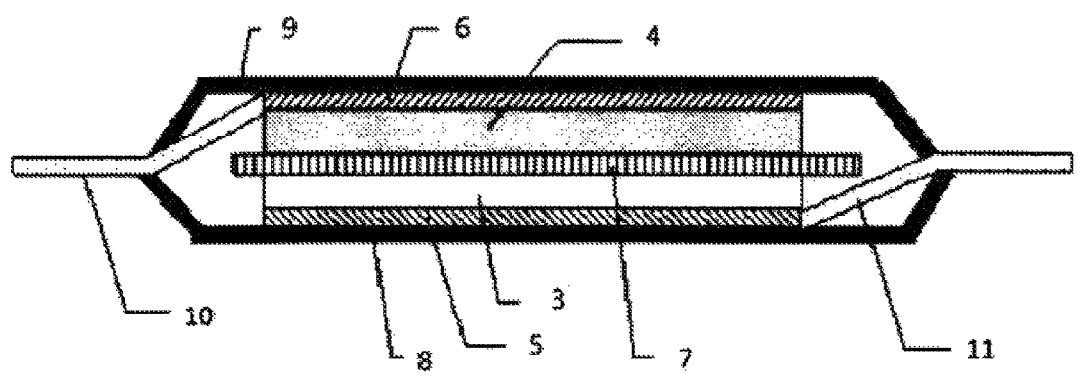
FIG. 2 is a cross-sectional view of a non-aqueous electrolyte secondary battery including a negative electrode according to an embodiment of the present invention.

The configuration of the non-aqueous electrolyte secondary battery in which the negative electrode of the present invention is used will be described with reference to the drawings. FIG. 2 is an example of a schematic configuration diagram of the secondary battery in which the negative electrode of the present invention is used. A layer 3 containing a positive electrode active material is formed on a positive-electrode current collector 5 in the positive electrode, and a layer 4 containing a negative electrode active material is formed on a negative-electrode current collector 6 in the negative electrode by the manufacturing method according to the present invention. The positive electrode and the negative electrode are oppositely arranged across a porous separator 7. The porous separator 7 is arranged substantially parallel to the layers 3 and 4. In the secondary battery of the present invention, outer packages 8 and 9 house an electrode element, in which the positive electrode and the negative electrode are oppositely arranged, and an electrolytic solution. A positive electrode tab 11 and a negative electrode tab 10 are connected to the positive-electrode current collector 5 and the negative-electrode current collector 6, respectively, and the tabs are drawn out of a container. The shape of the non-aqueous electrolytic solution secondary battery according to the present embodiment is not particularly limited, and examples thereof include laminate-outer package type, cylindrical type, square type, and coin type.

A method for manufacturing the secondary battery will be described by taking a method for manufacturing the secondary battery of FIG. 2 as an example. The non-aqueous electrolyte secondary battery of FIG. 2 is manufactured by, in dry air or an inert gas atmosphere, layering the negative electrode and the positive electrode with the porous separator 7 therebetween or winding the layered product, housing the product in an outer package such as a battery can and a flexible film consisting of a layered body of a synthetic resin and metal foil, impregnating the product with a non-aqueous electrolytic solution, and sealing the outer package.

EXAMPLES

Examples 1 to 3

(Production of Negative Electrode)

In the present examples, a mixture in which the weight ratio of Si to carbon (C) was 82:3 was used as the negative electrode active material. As the binder composition, a solution containing a high-molecular-weight poly(amic acid) solution (MW=50,000) and a low-molecular-weight poly(amic acid) solution (MW=500) by a solute weight ratio listed in Table 1 was used.

The negative electrode active material and the binder composition were kneaded with N-methylpyrrolidone (NMP) as a solvent so that the weight ratio of poly(amic acid)s (the total solute weight of the high-molecular-weight poly(amic acid) and the low-molecular-weight poly(amic acid)) to the negative electrode active material would be 15:85 to obtain an electrode mixture slurry. The electrode mixture slurry was applied to a copper foil having a thickness of 10 μm and dried at 125° C. for 5 minutes. Then, compression molding was performed with a roll press and a drying treatment was performed again in a drying furnace at 350° C. for 30 minutes in a $N_2$ atmosphere. The copper foil on which a negative-electrode active material layer had been formed was stamped into a circular shape having a diameter of 12 mm to produce a negative electrode.

(Production of Battery)

The produced negative electrode was layered with a counter electrode of Li metal to produce a model cell with EC/DEC/EMC=3/5/2 (the volume ratio) containing 1 M of $LiPF_6$ as an electrolytic solution, and charging and discharging were performed in a current density of 0.55 mA/cm$^2$ in a voltage range of 0.02 to 1.0 V. The quantity of electricity flowed from the start until the end of charging or discharging was set to be the charge capacity or the discharge capacity, and the initial charge/discharge efficiency was calculated as the percentage of the discharge capacity compared to the charge capacity in the first cycle. Table 1 lists the results.

The solute weight ratio of the high-molecular-weight poly(amic acid) solution (MW=50,000) to the low-molecular-weight polyamic solution (MW=500) is represented by X:Y.

TABLE 1

|  | X:Y | Initial charge/discharge efficiency (%) |
| --- | --- | --- |
| Example 1 | 10:5 | 76 |
| Example 2 | 5:10 | 75 |
| Example 3 | 12:3 | 74 |

As listed in Table 1, good charge/discharge characteristics were observed.

Comparative Examples 1 and 2

Table 2 lists the results in the cases that were the same as the examples except that only either the high-molecular-weight poly(amic acid) solution (MW=50,000) or the low-molecular-weight poly(amic acid) solution (MW=500) was contained.

TABLE 2

|  | X:Y | Initial charge/discharge efficiency (%) |
| --- | --- | --- |
| Comparative Example 1 | 0:10 | 71 |
| Comparative Example 2 | 10:0 | 72 |

The batteries of Examples 1 to 3 in which the solute weight ratios of the high-molecular-weight poly(amic acid) solution (MW=50,000) to the low-molecular-weight poly (amic acid) solution (MW=500) was in the range listed in Table 1 showed higher initial charge/discharge efficiencies and better charge/discharge characteristics than those in Comparative Examples 1 and 2.

REFERENCE SIGNS LIST 1 negative-electrode active material layer
2 negative-electrode current collector
3 positive-electrode active material layer
4 negative-electrode active material layer
5 positive-electrode current collector
6 negative-electrode current collector
7 porous separator
8 laminate outer package
9 laminate outer package
10 negative electrode tab
11 positive electrode tab

The invention claimed is:

1. An electrode mixture slurry comprising:
   an electrode binder composition comprising a high-molecular-weight poly(amic acid) having a weight-average molecular weight of 5,000 or more and 100,000 or less and a low-molecular-weight poly(amic acid) having a weight-average molecular weight of 100 or more and 2,000 or less; and
   an electrode active material.

2. The electrode mixture slurry according to claim 1, wherein a solute weight ratio of the high-molecular-weight poly(amic acid) to the low-molecular-weight poly(amic acid) is in a range of 2:10 to 10:2.

3. The electrode mixture slurry according to claim 2, wherein the solute weight ratio of the high-molecular-weight poly(amic acid) to the low-molecular-weight poly(amic acid) is in a range of 5:10 to 10:5.

4. The electrode mixture slurry according to claim 1, wherein the electrode active material is a negative electrode active material comprising one or more selected from the group consisting of:
- a metal capable of being alloyed with lithium;
- an alloy of the metal; and
- a carbon material.

5. The electrode mixture slurry according to claim 4, wherein the metal capable of being alloyed with lithium is one or more selected from the group consisting of Si, Sn, In, and Al.

6. The electrode mixture slurry according to claim 4, wherein the carbon material is graphite or hard carbon.

7. A secondary battery electrode comprising a current collector and an active material layer formed on the current collector,
wherein the active material layer is formed of the electrode mixture slurry according to claim 1.

8. The secondary battery electrode according to claim 7, wherein the active material layer comprises a polyimide produced through imidization of the high-molecular-weight poly(amic acid) and the low-molecular-weight poly(amic acid).

9. A non-aqueous electrolyte secondary battery comprising the electrode according to claim 7.

10. A method for manufacturing an electrode mixture slurry, the method comprising kneading:
an electrode binder composition comprising a high-molecular-weight poly(amic acid) having a weight-average molecular weight of 5,000 or more and 100,000 or less and a low-molecular-weight poly(amic acid) having a weight-average molecular weight of 100 or more and 2,000 or less; and
an electrode active material.

11. The method for manufacturing the electrode mixture slurry according to claim 10, wherein a solute weight ratio of the high-molecular-weight poly(amic acid) to the low-molecular-weight poly(amic acid) is in a range of 2:10 to 10:2.

12. The method for manufacturing the electrode mixture slurry according to claim 11, wherein the solute weight ratio of the high-molecular-weight poly(amic acid) to the low-molecular-weight poly(amic acid) is in a range of 5:10 to 10:5.

13. A method for manufacturing a secondary battery electrode, the method comprising the steps of:
applying the electrode mixture slurry manufactured by the method according to claim 10 to a current collector; and
imidizing at least part of the poly(amic acid)s contained in the electrode mixture by drying the current collector, on which the electrode mixture has been applied, under a high-temperature atmosphere.

14. A method for manufacturing a non-aqueous electrolyte secondary battery, wherein at least one of a positive electrode and a negative electrode is the electrode manufactured by the method according to claim 13.

15. The method according claim 13, wherein thermal decomposition of a polyimide does not occur while drying the current collector.

* * * * *